(12) United States Patent
Okada et al.

(10) Patent No.: US 9,115,005 B2
(45) Date of Patent: Aug. 25, 2015

(54) CATHODE ACTIVE MATERIAL PRECURSOR PARTICLE, METHOD FOR PRODUCING THEREOF AND METHOD FOR PRODUCING CATHODE ACTIVE MATERIAL FOR LITHIUM SECONDARY BATTERY

(75) Inventors: Shigeki Okada, Nishio (JP); Ryuta Sugiura, Toyohashi (JP); Akira Urakawa, Nagoya (JP); Kazuki Maeda, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 270 days.

(21) Appl. No.: 13/613,794

(22) Filed: Sep. 13, 2012

(65) Prior Publication Data

US 2013/0071748 A1 Mar. 21, 2013

Related U.S. Application Data

(60) Provisional application No. 61/535,422, filed on Sep. 16, 2011, provisional application No. 61/650,065, filed on May 22, 2012.

(51) Int. Cl.
*H01M 4/88* (2006.01)
*C01G 53/00* (2006.01)
*H01M 4/485* (2010.01)
*H01M 4/525* (2010.01)
*H01M 4/02* (2006.01)

(52) U.S. Cl.
CPC .............. *C01G 53/006* (2013.01); *C01G 53/42* (2013.01); *H01M 4/485* (2013.01); *H01M 4/525* (2013.01);

(Continued)

(58) Field of Classification Search
CPC ... H01M 4/0471; H01M 4/525; H01M 4/131; H01M 4/1391; H01M 2004/021; C01G 51/50; C01D 15/02
USPC ................. 252/182.1; 427/77; 429/223, 231.8
See application file for complete search history.

(56) References Cited

U.S. PATENT DOCUMENTS

| | | | |
|---|---|---|---|
| 5,631,100 | A | 5/1997 | Yoshino et al. |
| 2005/0123832 | A1 | 6/2005 | Tsukuma et al. |

(Continued)

FOREIGN PATENT DOCUMENTS

| | | |
|---|---|---|
| EP | 2 071 650 A1 | 6/2009 |
| EP | 2 202 828 A1 | 6/2010 |

(Continued)

OTHER PUBLICATIONS

International Search Report and Written Opinion dated Nov. 6, 2012.

*Primary Examiner* — Khanh Tuan Nguyen
(74) *Attorney, Agent, or Firm* — Burr & Brown, PLLC (57) ABSTRACT

A cathode active material precursor particle, a method for producing thereof and a method for producing cathode active material for a lithium secondary battery. The cathode active material precursor particle is capable of forming a cathode active material for a lithium secondary battery including a lithium composite oxide having a layered rock salt structure through lithium incorporation. The particles are characterized by the cathode active material precursor particle being formed into a substantially spherical shape and includes therein a large number of voids in a substantially uniform manner; and the cathode active material precursor particle has: an average particle diameter D50 of 0.5 to 5 μm; a specific surface area of 3 to 25 $m^2/g$; and a relative tap density, which is a value obtained by dividing a tap density by a theoretical density of a material constituting the cathode active material precursor particle, of 0.25 to 0.4.

4 Claims, 5 Drawing Sheets

(52) U.S. Cl.
CPC ......... *C01P 2002/54* (2013.01); *C01P 2004/52* (2013.01); *C01P 2004/61* (2013.01); *C01P 2004/62* (2013.01); *C01P 2006/11* (2013.01); *C01P 2006/12* (2013.01); *C01P 2006/40* (2013.01); *H01M 2004/021* (2013.01); *Y02E 60/122* (2013.01)

(56) References Cited

U.S. PATENT DOCUMENTS

| | | | |
|---|---|---|---|
| 2008/0268347 | A1 | 10/2008 | Ohzuku et al. |
| 2010/0173204 | A1* | 7/2010 | Sugiura et al. ............. 429/231.8 |
| 2010/0209771 | A1 | 8/2010 | Shizuka et al. |

FOREIGN PATENT DOCUMENTS

| | | |
|---|---|---|
| EP | 2 466 671 A2 | 6/2012 |
| JP | 05-226004 A1 | 9/1993 |
| JP | 2002-075365 A1 | 3/2002 |
| JP | 2004-083388 A1 | 3/2004 |
| JP | 2005-336004 A1 | 12/2005 |
| JP | 2008-258160 A1 | 10/2008 |
| JP | 2009-081130 A1 | 4/2009 |
| JP | 2009-104974 A1 | 5/2009 |
| JP | 2009-117241 A1 | 5/2009 |
| JP | 2011-105594 A1 | 6/2011 |
| WO | 2010/094394 A1 | 8/2010 |

* cited by examiner

(iii)

CATHODE ACTIVE MATERIAL PRECURSOR PARTICLE, METHOD FOR PRODUCING THEREOF AND METHOD FOR PRODUCING CATHODE ACTIVE MATERIAL FOR LITHIUM SECONDARY BATTERY

BACKGROUND OF THE INVENTION

1. Field of the Invention

The present invention relates to a cathode active material precursor particle, a production method therefor, and a production method for a cathode active material for a lithium secondary battery. The "cathode active material precursor" used herein refers to a material capable of forming a cathode active material for a lithium secondary battery through lithium incorporation.

2. Description of Related Art

As a cathode active material for a lithium secondary battery, there is widely known one using a lithium composite oxide (lithium transition metal oxide) (see, for example, Japanese Patent Application Laid-open No. Hei 05-226004). Further, in a cathode active material of this type, there is known one having formed therein voids (also referred to as "pore" or "cavity") for the purpose of improving a rate characteristic and a cycle characteristic (see, for example, Japanese Patent Application Laid-open No. 2002-75365, Japanese Patent Application Laid-open No. 2004-083388, and Japanese Patent Application Laid-open No. 2009-117241).

SUMMARY OF THE INVENTION

However, none of the conventional technologies has yet achieved both of excellent rate characteristic and practically sufficient durability (cycle characteristic). That is, for example, in the technologies described in Japanese Patent Application Laid-open No. 2004-083388 and the like, a pore forming agent (void-forming agent) is used for forming the voids. However, such pore forming agent is not a material for constituting a cathode active material as a final target. Further, a variation in an inner microstructure of the cathode active material occurs owing to addition of such pore forming agent (for example, through uneven distribution (localization) of such pore forming agent).

The present invention is directed to a production method for a cathode active material for a lithium secondary battery, wherein the material including a lithium composite oxide having a layered rock salt structure. The present invention is also directed to a cathode active material precursor particle capable of forming the cathode active material including a lithium composite oxide through lithium incorporation. The present invention is also directed to a production method for the cathode active material precursor particle.

A "layered rock salt structure" used herein refers to a crystal structure in which lithium layers and layers of a transition metal other than lithium are arranged in alternating layers with an oxygen layer therebetween; i.e., a crystal structure in which transition metal ion layers and lithium layers are arranged in alternating layers via oxide ions (typically, α-NaFeO$_2$ type structure: cubic rock salt type structure in which transition metal and lithium are arrayed orderly in the direction of the [111] axis). Further, the "lithium composite oxide" refers to an oxide represented by Li$_x$MO$_2$ (0.05<x<1.10, M represents at least one kind of transition metal).

As the lithium composite oxides having a layered rock salt structure, there may be used lithium cobaltate, lithium nickelate, lithium manganate, lithium nickel manganate, lithium nickel cobaltate, lithium cobalt nickel manganate, lithium cobalt manganate, or the like. In addition to those materials, one or more elements selected from, Mg, Al, Si, Ca, Ti, V, Cr, Fe, Cu, Zn, Ga, Ge, Sr, Y, Zr, Nb, Mo, Ag, Sn, Sb, Te, Ba, and Bi may be contained therein. That is, for example, the lithium composite oxide may be a nickel-cobalt-aluminum-based composite oxide.

A feature according to one aspect of the present invention resides in that the cathode active material precursor particle is formed into a substantially spherical shape and includes therein a large number of voids in a substantially uniform manner; and that the cathode active material precursor particle has an average particle diameter D50 of 0.5 to 5 μm; a specific surface area of 3 to 25 m$^2$/g; and a relative tap density, which is a value obtained by dividing a tap density by a theoretical density of a material constituting the cathode active material precursor particle, of 0.25 to 0.4.

It should be noted that D50 refers to a median diameter measured using a laser diffraction method. Further, the "void" refers to a region or a space substantially free of a material constituting a main raw material for the lithium composite oxide (typically, a compound of a transition metal other than lithium). Accordingly, a solvent and the like may intrude into the "void."

The cathode active material precursor particle may be formed by: wet-pulverizing and mixing a raw material powder including a transition metal hydroxide constituting a main raw material for the lithium composite oxide to prepare a slurry; spray-drying the slurry to form a granule; and thermally treating the granule.

A feature according to another aspect of the present invention resides in that the production method for the cathode active material precursor particle includes: a granulation step of forming a granule, which includes a large number of plate-like particles of a transition metal hydroxide constituting a main raw material for the lithium composite oxide and includes therein a large number of voids in a substantially uniform manner; and a thermal treatment step of thermally treating the granule to form the cathode active material precursor particle, which is formed into a substantially spherical shape and includes therein a large number of voids in a substantially uniform manner, and has an average particle diameter D50 of 0.5 to 5 μm, a specific surface area of 3 to 25 m$^2$/g, and a relative tap density, which is a value obtained by dividing a tap density by a theoretical density of a material constituting the granule (cathode active material precursor particle), of 0.25 to 0.4.

A feature according to still another aspect of the present invention resides in that the production method for the cathode active material includes: the granulation step; the thermal treatment step; a forming step of forming a large number of the cathode active material precursor particles into a predetermined shape to provide a green product; and a sintering step of sintering the green product to generate the lithium composite oxide.

The granulation step is suitably a step of forming the granule through spray drying of a slurry prepared by wet-pulverizing and mixing a raw material powder including the transition metal hydroxide. In particular, two-fluid nozzle type spray drying may be suitably used.

The transition metal hydroxide may be nickel hydroxide and cobalt hydroxide. That is, the raw material powder may include nickel hydroxide and cobalt hydroxide. In addition, the raw material powder may include aluminum oxide hydrate or aluminum hydroxide.

The cathode active material precursor particle of the present invention is formed into a substantially spherical shape and includes therein a large number of voids in a substantially uniform manner so that the cathode active material precursor particle has a predetermined average particle diameter (D50), a predetermined specific surface area, and the relative tap density. Thus, in generating the cathode active material through the subsequent steps, i.e., the forming step and the sintering step (lithium incorporation step), a sintering environment is stabilized and a lithium incorporation (diffusion) state is made uniform, and as a result, an inner microstructure of a sintered body of the cathode active material is made uniform to a possible extent. Further, the shape stability and crystallographic synthesis degree of the cathode active material as a final target become satisfactory.

According to the production method for a cathode active material precursor particle of the present invention, the cathode active material precursor particle having the above-mentioned feature can be formed satisfactorily without using any pore forming agent by thermally treating the granule which includes a large number of the plate-like particles of the transition metal hydroxide and includes therein a large number of voids in a substantially uniform manner. In particular, the granule having the above-mentioned feature can be formed simply and stably through spray drying of the slurry. Thus, according to the production method of the present invention, a variation in an inner microstructure of the cathode active material precursor particle is prevented from occurring owing to addition of a pore forming agent.

Further, according to the production method for a cathode active material of the present invention, the cathode active material having formed therein a large number of voids can be formed satisfactorily without using any pore forming agent by forming and sintering of the cathode active material precursor particle having the above-mentioned characteristics. Thus, according to the production method of the present invention, a variation in an inner microstructure of the cathode active material is prevented from occurring owing to addition of the pore forming agent. That is, according to the production method of the present invention, such a microstructure in the cathode active material as to provide excellent battery characteristics to be formed satisfactorily (simply and stably) without using any pore forming agent.

DETAILED DESCRIPTION OF THE INVENTION

Preferred embodiments of the present invention are next described with reference to examples and comparative examples. Note that, the following description of the embodiments is nothing more than the specific description of mere example embodiments of the present invention to the possible extent in order to fulfill description requirements (descriptive requirement and enabling requirement) of specifications required by law.

Thus, as described later, naturally, the present invention is not limited to the specific configurations of embodiments and examples to be described below. Various variations (modifications) that can be made to the embodiments and examples are collectively described herein at the end to a maximum possible extent, because insertion thereof into the description of the embodiments would disturb understanding of consistent description of the embodiments.

1. Schematic Configuration of Lithium Secondary Battery

Figure 1A:
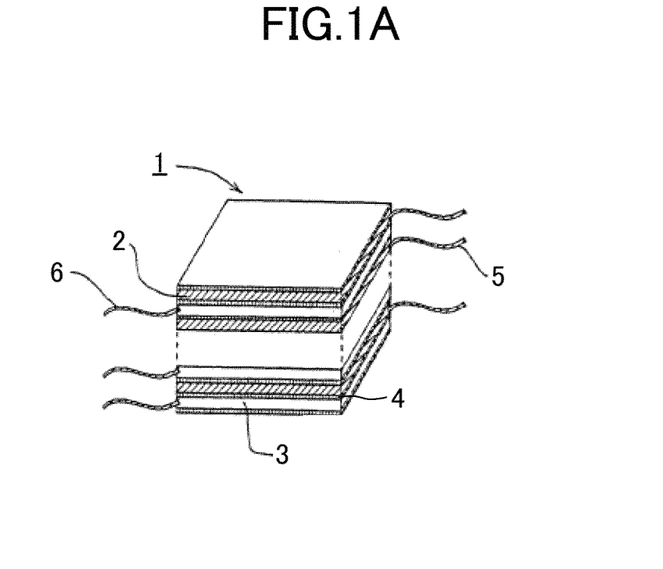
FIG. 1A is a sectional view of a schematic configuration of an exemplary lithium secondary battery to which one embodiment of the present invention is applied.

FIG. 1A is a sectional view of the schematic configuration of an exemplary lithium secondary battery 1 to which one embodiment of the present invention is applied. Referring to FIG. 1A, the lithium secondary battery 1 is the so-called liquid-type battery and includes cathode plates 2, anode plates 3, separators 4, cathode tabs 5, and anode tabs 6.

The separator 4 is provided between the cathode plate 2 and the anode plate 3. More specifically, the cathode plate 2, the separator 4, and the anode plate 3 are stacked in this order. The cathode tabs 5 are electrically connected to the respective cathode plates 2. Similarly, the anode tabs 6 are electrically connected to the respective anode plates 3.

The lithium secondary battery 1 illustrated in FIG. 1A is configured such that a stack of the cathode plates 2, the separators 4, and the anode plates 3, and an electrolytic solution containing a lithium compound as an electrolyte are liquid-tightly sealed in a specific cell casing (not illustrated).

Figure 1B:
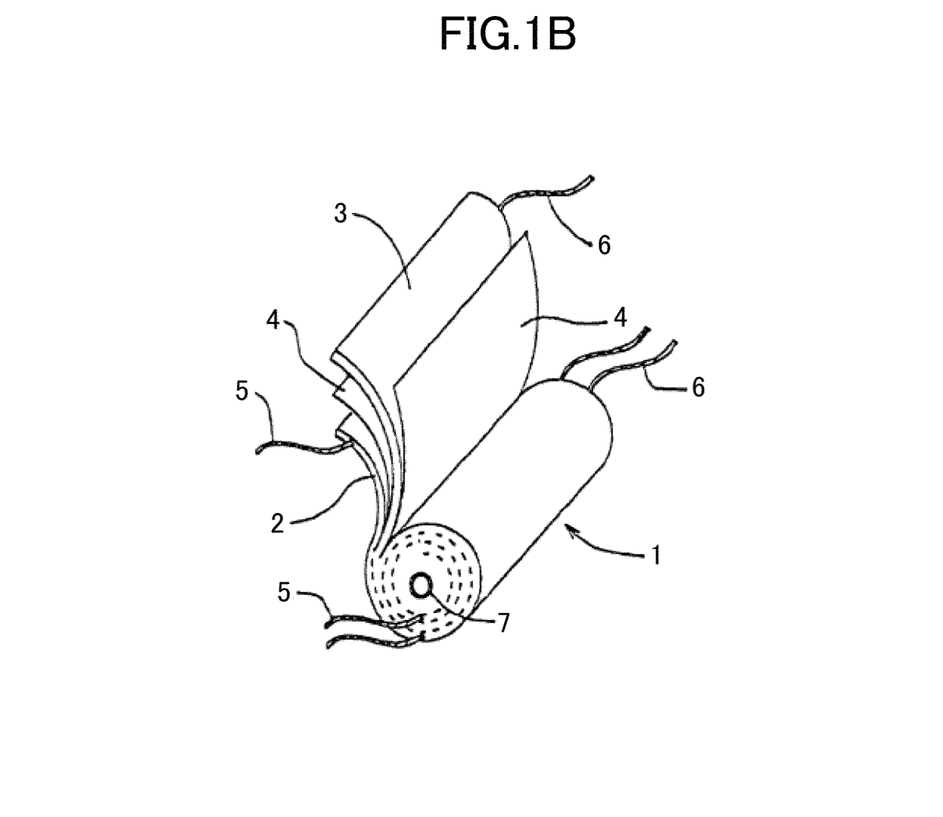
FIG. 1B is a perspective view of a schematic configuration of another exemplary lithium secondary battery to which one embodiment of the present invention is applied.

FIG. 1B is a perspective view of the schematic configuration of another exemplary lithium secondary battery 1 to which one embodiment of the present invention is applied. Referring to FIG. 1A, this lithium secondary battery 1 is also a liquid-type battery and includes a cathode plate 2, an anode plate 3, separators 4, cathode tabs 5, anode tabs 6, and a core 7.

The lithium secondary battery 1 illustrated in FIG. 1B is configured such that an internal electrode body, which is formed through winding, on the core 7 as a center, of a stack of the cathode plate 2, the separators 4, and the anode plate 3, and the above-mentioned electrolytic solution are liquid-tightly sealed in a specific cell casing (not illustrated).

2. Configuration of Cathode

Figure 2A:
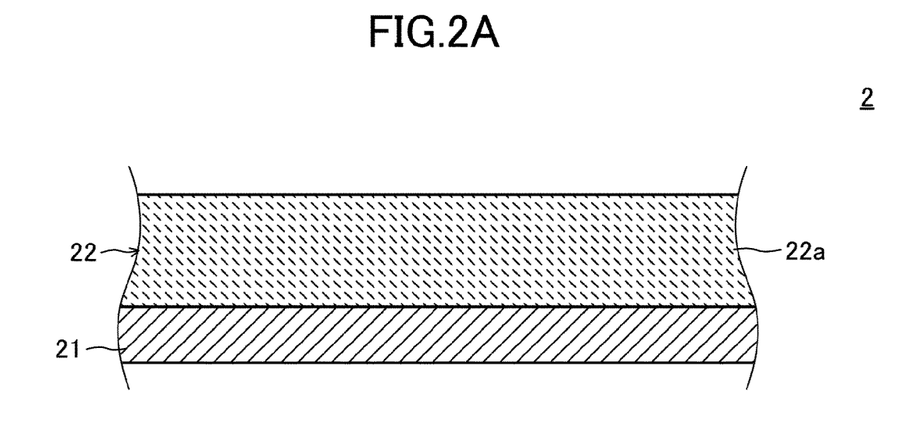
FIG. 2A is an enlarged sectional diagram of an exemplary cathode plate illustrated in FIG. 1A and FIG. 1B.
Figure 2B:
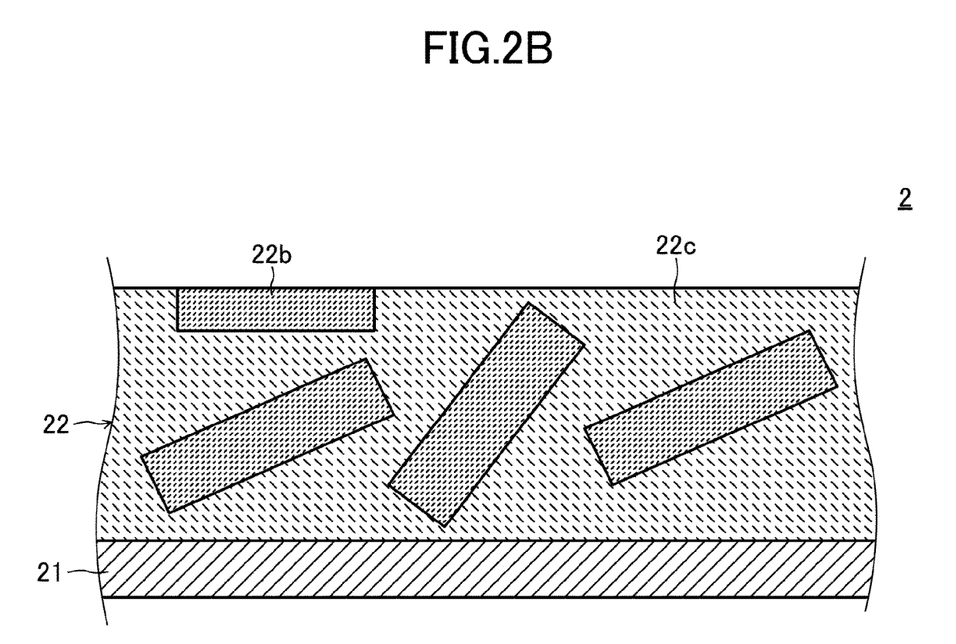
FIG. 2B is an enlarged sectional diagram of another exemplary cathode plate illustrated in FIG. 1A and FIG. 1B.

FIG. 2A and FIG. 2B is each an enlarged sectional view of the exemplary cathode plate 2 illustrated in FIG. 1A and FIG. 1B. Referring to FIG. 2A and FIG. 2B, the cathode plate 2 includes a cathode collector 21 and a cathode active material layer 22. That is, the cathode plate 2 is formed in a state in which the cathode collector 21 and the cathode active material layer 22 are joined to (stacked on) each other.

In FIG. 2A, the cathode active material layer 22 includes a cathode active material film 22a, which is a self-supported film formed of a sintered body of a cathode active material. The "self-supported film" as used herein refers to a film that can be handled in itself after formation (typically, after sintering). In FIG. 2B, the cathode active material layer 22 includes cathode active material particles 22b, which are particles formed of a sintered body of a cathode active material, and a binder 22c, which supports the cathode active material particles 22b in a dispersed state and contains a conductive aid.

In this embodiment, the cathode active material layer 22 is formed as a film or plate of a cathode active material including a lithium composite oxide having a layered rock salt structure. Similarly, the cathode active material particles 22b are formed as plate-like particles of a cathode active material including a lithium composite oxide having a layered rock salt structure.

3. Overview of Production Method

Figure 3:
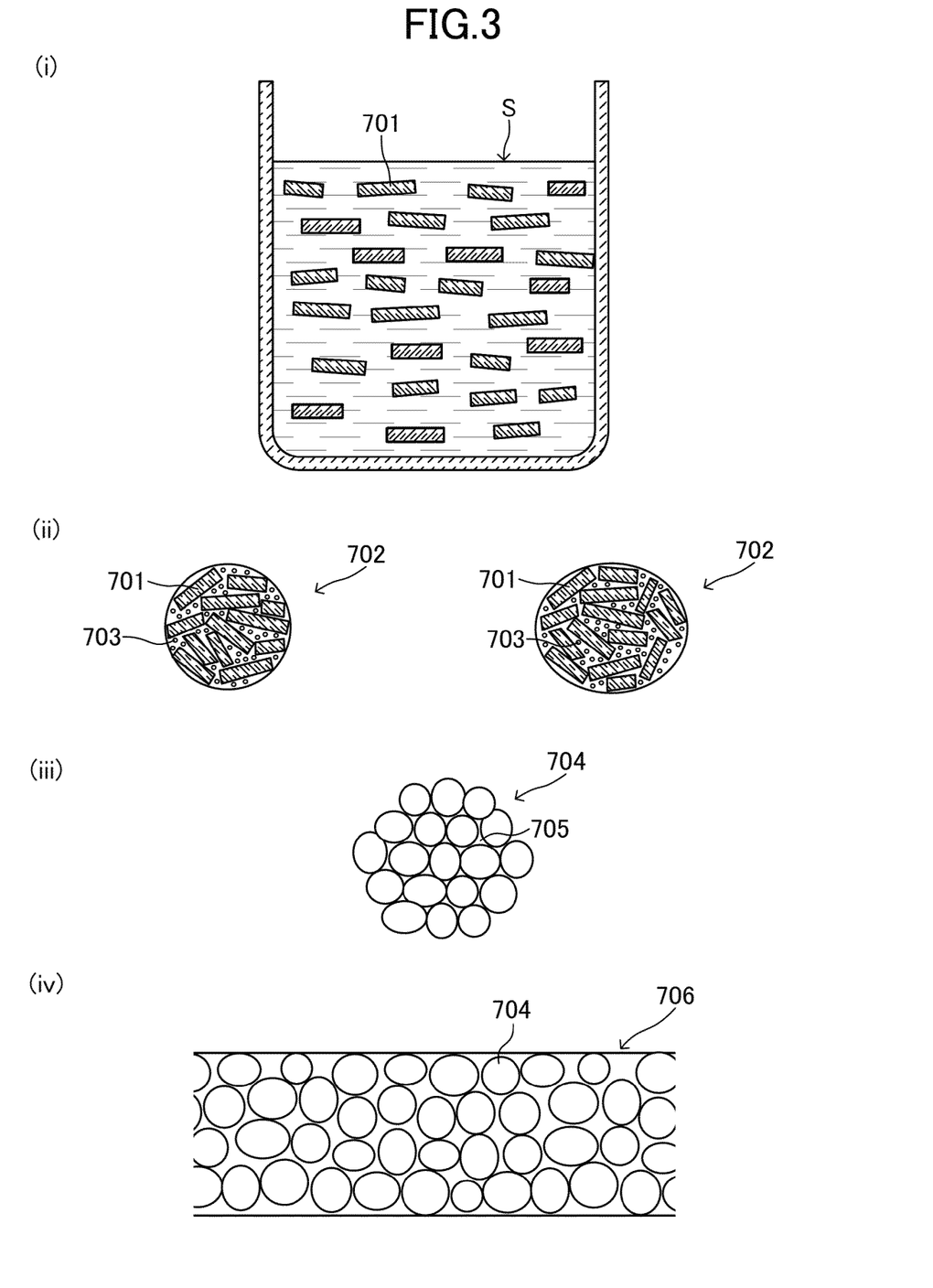
FIG. 3 is a diagram illustrating a scheme of a production method for a cathode active material film illustrated in FIG. 2A or a cathode active material particle illustrated in FIG. 2B.

The cathode active material film 22a illustrated in FIG. 2A and the cathode active material particles 22b illustrated in FIG. 2B may be produced by the following production method. FIG. 3 is a diagram illustrating a scheme of such production method. Hereinafter, an overview of the production method according to this embodiment is described with reference to FIG. 3 as appropriate. It should be noted that each of parts (i) to (iv) of FIG. 3 is a "conceptual diagram" and does not represent a correct sectional diagram or lateral diagram of an object itself.

(1) Preparation of Slurry

A slurry S is prepared by wet-pulverizing and mixing a raw material powder including a transition metal hydroxide constituting a main raw material for a lithium composite oxide (see part (i) of FIG. 3). As wet-pulverizing and mixing means, there may be appropriately used well-known devices (e.g., medium-stirring mills such as a ball mill and a bead mill, and medium-less type devices such as a homogenizer and a Nanomizer (registered trademark)).

Here, in the production method according to this embodiment, compounds except a lithium compound (e.g., aluminum oxide hydrate, aluminum hydroxide, nickel hydroxide, and cobalt hydroxide) are used for the raw material powder. More specifically, the production method according to this embodiment is the so-called "two-stage sintering" process involving a calcination step as a thermal treatment step of a transition metal compound (hydroxide or oxide) and a sintering step of incorporating lithium by thermally treating a product obtained in such calcination step (typically, transition metal composite oxide: e.g., (Ni, Co, Al)O) together with a lithium compound. The use of such "two-stage sintering" process realizes satisfactory uniformity of a chemical composition and a microstructure in the cathode active material film 22a and the cathode active material particles 22b, and satisfactory shape stability of the cathode active material film 22a and the cathode active material particles 22b (satisfactory dimensional accuracy in forming the cathode active material film 22a and the cathode active material particles 22b having desired outer shapes).

Plate-like particles 701 of a transition metal hydroxide are dispersed in the prepared slurry S as illustrated in part (i) of FIG. 3. Here, such plate-like particles 701 are suitably pulverized so as to achieve a primary particle level (particle diameter: about 100 nm).

(2) Granulation

The slurry S prepared as described above is used to form a granule 702 including a large number of plate-like particles 701 of a transition metal hydroxide (see part (ii) of FIG. 3). The granule 702 includes therein a large number of voids 703 in a substantially uniform manner. In a granulation step, spray drying may be preferably used. The reason why the spray drying (in particular, two-fluid nozzle type) is preferably used is described later.

(3) Thermal Treatment (Calcination)

The granule 702 is thermally treated to form a cathode active material precursor particle 704 which is substantially spherical and has an average particle diameter D50 of 0.5 to 5 μm, a specific surface area of 3 to 25 m²/g, and a relative tap density of 0.25 to 0.4. The cathode active material precursor particle 704 includes therein a large number of voids 705 in a substantially uniform manner (see part (iii) of FIG. 3).

(4) Forming

The cathode active material precursor particles 704 obtained described above are used to form a film-like or plate-like green product 706 by a well-known forming method. Such forming step may be carried out, for example, by forming a slurry to be formed, which has been prepared by dispersing the cathode active material precursor particles 704 in an appropriate dispersion medium, into a green sheet using a doctor blade-type sheet-forming apparatus (doctor blade method), a drum dryer, a disc dryer, a screen printer, or the like. It should be noted that, in the forming, it is necessary to set treatment conditions so as to prevent the cathode active material precursor particles 704 from being crushed.

(5) Sintering (Lithium Incorporation)

The green product 706 is fired to generate a lithium composite oxide. Thus, a film or plate-like particles of a cathode active material including therein a large number of voids formed in a uniform manner (cathode active material film 22a illustrated in FIG. 2A or cathode active material particles 22b illustrated in FIG. 2B) can be obtained.

The lithium compound may be added during forming, or may be added in a period from the end of forming to the beginning of sintering. That is, for example, the lithium compound may be added together with the cathode active material precursor particles 704 to the slurry to be formed during forming. Alternatively, a sintering (lithium incorporation) step may be carried out at two stages including calcining the green product 706 free of the lithium compound once (green product calcination) and then sintering a mixture of such calcined green product and the lithium compound (sintering).

4. Specific Example of Production Method

Hereinafter, a specific example of the production method described above is described in detail.

(1) Preparation of Slurry 81.6 parts by weight of $Ni(OH)_2$ powder (product of Kojundo Chemical Laboratory Co., Ltd.), 15.0 parts by weight of $Co(OH)_2$ powder (product of Wako Pure Chemical Industries, Ltd.), and 3.4 parts by weight of $Al_2O_3.H_2O$ powder (product of SASOL) were weighed. Next, a vehicle formed of 97.3 parts by weight of pure water, 0.4 part by weight of a dispersant (product of NOF CORPORATION: product No. AKM-0521), 0.2 part by weight of 1-octanol (product of KATAYAMA CHEMICAL INDUSTRIES Co., Ltd.) as a defoamer, and 2.0 parts by weight of a binder (product of JAPAN VAM & POVAL CO., LTD.: product No. PV3) were produced.

Subsequently, such vehicle and a raw material powder (powders weighed above) were wet-mixed and pulverized together to prepare a slurry. The wet-mixing and pulverization were carried out by 24-hour treatment in a ball mill using a zirconia ball having a diameter of 2 mm and the subsequent 40-minute treatment in a bead mill using zirconia beads each having a diameter of 0.1 mm.

(2) Granulation

The slurry was charged into a two-fluid nozzle type spray dryer to form a granule. Granules having a variety of sizes may be formed by appropriately adjusting parameters such as spraying pressure, a nozzle diameter, and a circulation air amount of a spray dryer.

(3) Thermal Treatment (Calcination)

The granule was thermally treated at 1,100° C. for 3 hours (air atmosphere) to afford a cathode active material precursor particle as a particle of a composite oxide of nickel, cobalt, and aluminum (($Ni_{0.8}$, $Co_{0.15}$, $Al_{0.05}$)O).

(4) Forming 100 parts by weight of the resultant cathode active material precursor particle powder, 50 parts by weight of a dispersion medium (xylene:butanol=1:1), 10 parts by weight of polyvinyl butyral (product of Sekisui Chemical Co., Ltd.: product No. BM-2) as a binder, 4.5 parts by weight of di(2-ethylhexyl) phthalate (DOP: product of KUROGANE KASEI Co., Ltd.) as a plasticizer, and 3 parts by weight of a dispersant (product of Kao Corporation, product name: "RHEODOL SPO-30") were weighed, preliminarily kneaded in a mortar, and then kneaded using a triroll, to thereby prepare a slurry to be formed having a viscosity of 2,000 to 3,000 cP (the viscosity was measured using an LVT type viscometer, a product of Brookfield Engineering Laboratories, Inc.).

The resultant slurry to be formed was used to form a sheet having a thickness of 50 μm by a doctor blade method. The sheet was dried and then subjected to punching processing to afford a green sheet of 1 mm square.

(5) Sintering (Lithium Incorporation)

The green sheet of 1 mm square obtained as described above was thermally treated in an air atmosphere at 900° C. to degrease and calcine the green sheet. A temperature for such green sheet calcination is lower than a temperature for the thermal treatment (granule calcination). This is because sintering of particles in the green sheet is suppressed from proceeding during green sheet calcination, which allows lithium to diffuse and react in a uniform manner during the subsequent sintering.

The resultant calcined green sheet whose both surfaces had been sprayed with a predetermined amount of a dispersion of lithium hydroxide in ethanol with an airbrush was thermally treated at 750° C. for 10 hours (air atmosphere) to afford plate-like particles of a cathode active material having a composition of $Li(Ni_{0.8}, Co_{0.15}, Al_{0.05})O_2$. It should be noted that the dispersion of lithium hydroxide in ethanol was prepared as described below.

First, $LiOH.H_2O$ powder (product of Wako Pure Chemical Industries, Ltd.) was pulverized using a jet mill so as to have a particle diameter, which was determined by visual observation with an electron microscope, of 1 to 5 μm. A mixture obtained by adding the powder at a ratio of 1 part by weight with respect to 100 parts by weight of ethanol (product of KATAYAMA CHEMICAL INDUSTRIES Co., Ltd.) was ultrasonically dispersed until it became impossible to visually observe the powder.

5. Evaluation Method

An evaluation method for the cathode active material produced by the production method according the specific example and the evaluation results are described below.

(1) Voidage

The "voidage" refers to a value calculated from a relative density (voidage=1-relative density). The relative density is a value determined by dividing a bulk density of a sintered body plate, which is determined by an Archimedes method, by a true density determined using a pycnometer. In the measurement of the bulk density, in order to sufficiently remove air present in cavities, a sample was subjected to boiling treatment in water.

(2) Average Particle Diameter (D50)

A dispersion obtained by dispersing a powder sample of a cathode active material precursor particle in water as a dispersion medium was charged into a laser diffraction/scattering type particle size distribution measuring device (product of HORIBA, Ltd., Model: "LA-700") to measure a median diameter (D50).

(3) Relative Tap Density

A graduated cylinder charged with a powder sample of a cathode active material precursor particle was tapped 200 times using a commercially available tap density measuring device. After that, the value of (weight of powder)/(bulk volume of powder) was calculated to determine a tap density. Then, the resultant tap density was divided by a theoretical density of a material constituting the cathode active material precursor particle to calculate a relative tap density [dimensionless value].

(3) Cell Characteristics

For evaluation of cell characteristics (rate characteristic and cycle characteristic), a coin cell for evaluation was produced in the following manner.

A cathode active material plate-like body (1 mm square) produced by the production method according the specific example was used as a cathode active material layer, and one surface thereof was sputtered with Au to form a cathode collector (thickness: 500 Å), to thereby produce a cathode plate. The thus produced cathode, an anode formed of a lithium metal plate, stainless-steel collector plates, and a separator were arranged in the order of collector plate-cathode-separator-anode-collector plate. The stacked product was filled with an electrolytic solution to produce a coin cell. The electrolytic solution was prepared by dissolving $LiPF_6$ in an equivolume mixture of ethylene carbonate (EC) and diethyl carbonate (DEC) serving as an organic solvent to a concentration of 1 mol/L.

(4-1) Rate Characteristic

One cycle consists of the following charge and discharge operations: constant-current charge is carried out at 0.1 C rate of current until the cell voltage becomes 4.3 V; subsequently, constant-voltage charge is carried out under a current condition of maintaining the cell voltage at 4.3 V, until the current drops to 1/20, followed by 10 minutes rest; and then, constant-current discharge is carried out at 0.2 C rate of current until the cell voltage becomes 2.5 V, followed by 10 minutes rest. A total of two cycles were performed under a condition of 25° C., and the discharge capacity as measured in the second cycle was employed as "discharge capacity at 0.2 C rate of current." A discharge capacity at 1 C rate was measured by carrying out the same charge and discharge operations except that only the discharge was carried out under the condition of 1 C rate of current.

(4-2) Cycle Characteristic

The fabricated cell was subjected to cyclic charge-discharge at a test temperature of 25° C. The cyclic charge-discharge repeats: (1) charge at 1 C rate of constant current and constant voltage until 4.3 V is reached, and (2) discharge at 1 C rate of constant current until 2.5 V is reached. A value in terms of percentage obtained by dividing the discharge capacity of the cell as measured after 50 repetitions of cyclic charge-discharge by the initial discharge capacity of the cell was defined as cycle characteristic (percent cycle capacity maintenance).

6. Evaluation Results

Cathode active materials of Comparative Examples 1 to 3 and Examples 1 to 9 were prepared using the production method illustrated in the specific example described above. Table 1 shows the evaluation results

TABLE 1

| | Average particle diameter | Relative tap | Specific surface area | Rate characteristic (mAh/g) | | Cycle characteristic |
|---|---|---|---|---|---|---|
| | D50 (μm) | density | (m²/g) | 0.2 C | 1 C | [%] |
| Comparative Example 1 | 0.2 | 0.2 | 13 | 185 | 160 | 80 |
| Comparative Example 2 | 0.5 | 0.5 | 8 | 182 | 165 | 90 |
| Example 1 | 0.5 | 0.25 | 3 | 190 | 178 | 90 |

TABLE 1-continued

| | Average particle diameter D50 (μm) | Relative tap density | Specific surface area (m²/g) | Rate characteristic (mAh/g) 0.2 C | 1 C | Cycle characteristic [%] |
|---|---|---|---|---|---|---|
| Example 2 | 0.5 | 0.26 | 10 | 189 | 180 | 90 |
| Example 3 | 0.5 | 0.28 | 25 | 190 | 180 | 93 |
| Example 4 | 1.5 | 0.33 | 15.3 | 195 | 182 | 97 |
| Example 5 | 2.5 | 0.35 | 10 | 198 | 183 | 96 |
| Example 6 | 3 | 0.38 | 9.5 | 193 | 180 | 94 |
| Example 7 | 5 | 0.4 | 7.5 | 190 | 180 | 93 |
| Example 8 | 5 | 0.4 | 3 | 192 | 183 | 92 |
| Example 9 | 5 | 0.4 | 25 | 189 | 179 | 90 |
| Comparative Example 3 | 7 | 0.38 | 0.5 | 183 | 170 | 88 |

Figure 4:
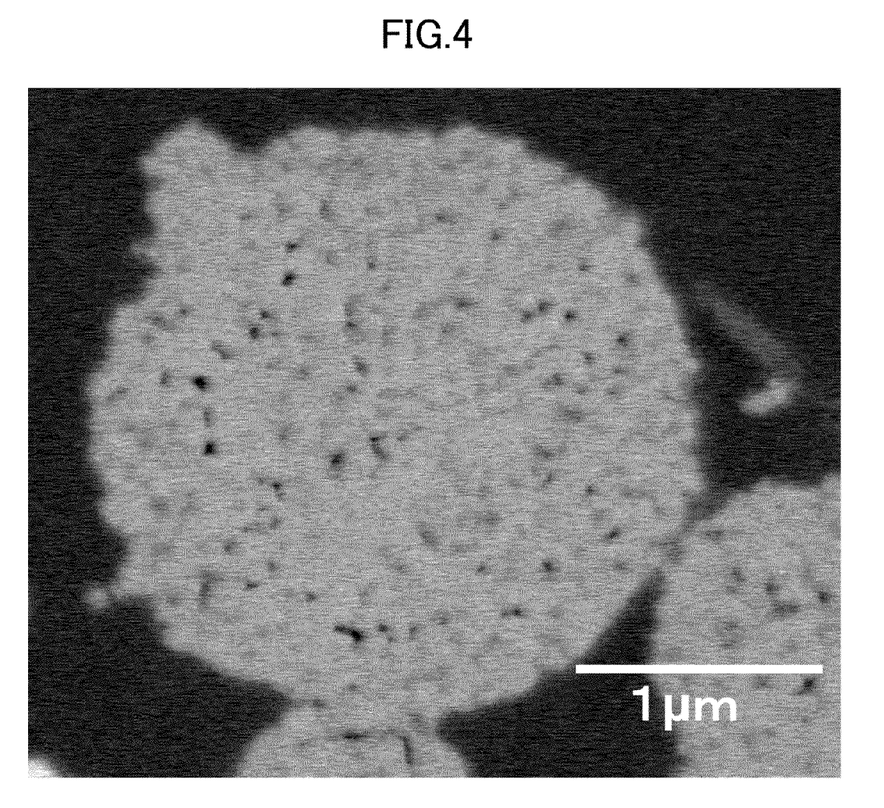
FIG. 4 is a scanning electron microscope photograph of a cross-section of a cathode active material precursor particle (Example 5) illustrated in part (iii) of FIG. 3.
Figure 5:
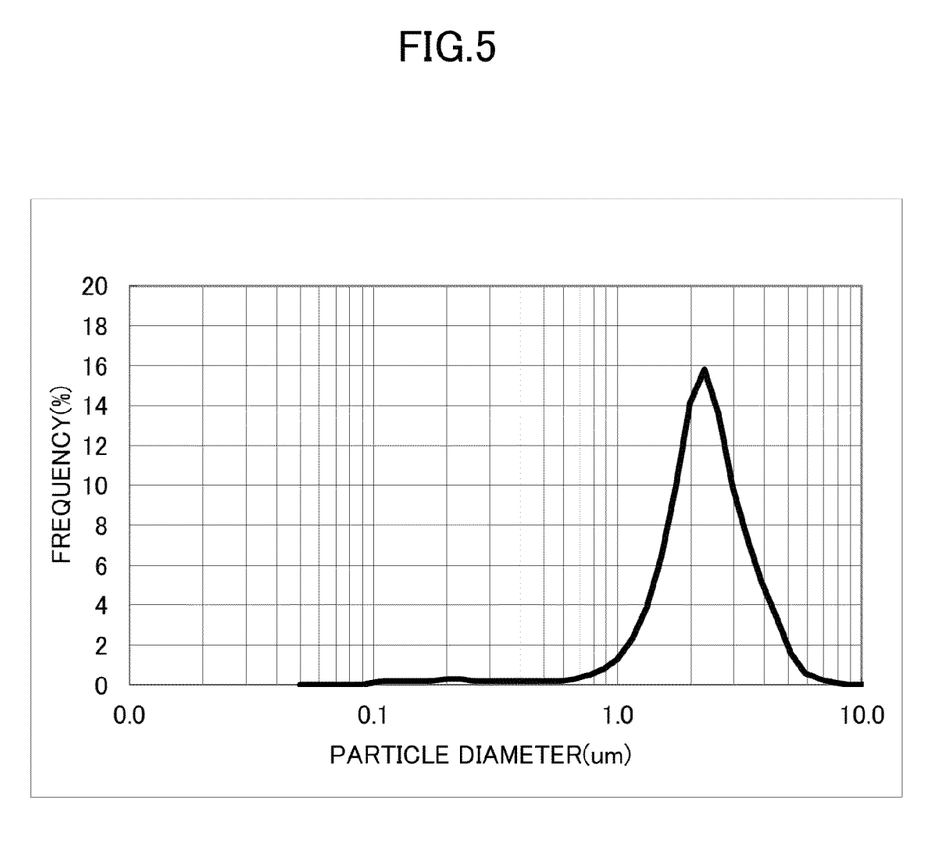
FIG. 5 is a graph showing particle size distribution of the cathode active material precursor particle (Example 5) illustrated in the part (iii) of FIG. 3.

As apparent from the results of Table 1, a satisfactory rate characteristic and a satisfactory cycle characteristic were obtained in Examples 1 to 9, in each of which the cathode active material precursor particle had an average particle diameter D50 of 0.5 to 5 μm, a specific surface area of 3 to 25 m²/g, and a relative tap density of 0.25 to 0.4. It should be noted that FIG. 4 shows a scanning electron microscope photograph of a cross-section of the cathode active material precursor particle in Example 5, and FIG. 5 shows a particle size distribution thereof. As shown in FIG. 4, in the cathode active material precursor particle of Example, an inner structure in which the cathode active material precursor particle had formed therein voids in a uniform manner was obtained.

In particular, in each of Examples 4 to 6, the ratio of the voids was about 10%, and open cavities accounted for 95% of the voids, showing that an inner microstructure suitable for a cathode active material was formed. It is conceivable that such a microstructure provided a balance between an active material density and a lithium ion mobility at a high level, resulting in a high rate characteristic.

As described above, according to this embodiment (example), an inner microstructure suitable for a cathode active material for providing excellent battery characteristics is formed satisfactorily without using any pore forming agent by setting the outer shape and inner structure of a cathode active material precursor particle to a predetermined state. In particular, a variation in an inner microstructure of the cathode active material is satisfactorily prevented from occurring owing to addition of the pore forming agent (e.g., through uneven distribution of such pore forming agent).

By the way, the cathode active material according to this embodiment (example) is not a dense body, and has voids at about 10%. In this regard, however, most of the voids are open pores as described above, and hence it can be said that the cathode active material according to this embodiment (example) does not have a structure expressed as "porous body" but has a structure in which fine open cavities are formed in a substantial dense body.

In this regard, in spray drying, two-fluid nozzle type spray drying has a feature in it is easy to form fine particles but a large particle size distribution is obtained. Thus, a granule obtained by the two-fluid nozzle type spray drying has a small particle diameter and a somewhat broad particle size distribution, and hence is very suitable for forming a cathode active material having the above-mentioned inner structure.

Meanwhile, Comparative Example 1 has a small average particle diameter and a small relative tap density. That is, the ratio of the composite oxide in the green sheet is small. Thus, in Comparative Example 1, it is estimated that sufficient necking did not occur among inner particles during thermal treatment of the green sheet, and as a result, the denseness of the cathode active material after lithium incorporation became insufficient.

In contrast, in Comparative Example 2, after thermal treatment of the green sheet (i.e., in the cathode active material precursor particle), the number of the voids decreased beyond expectation. This is probably because the ratio of the composite oxide in the green sheet reached a value equal to or more than a proper value. Thus, in Comparative Example 2, it is estimated that densification proceeded even in the cathode active material after lithium incorporation, resulting in a reduction in lithium ion mobility.

Further, also in Comparative Example 3, after thermal treatment of the green sheet, the number of the voids was very small. Thus, in Comparative Example 3, it is estimated that densification excessively proceeded in the finally obtained cathode active material, with the result that a desired rate characteristic could not be obtained even at the same relative tap density as in Example 7.

6. Exemplary Enumeration of Modifications

The above-mentioned embodiment and specific examples are, as described above, mere examples of the best mode of the present invention which the applicant of the present invention contemplated at the time of filing the present application. The above-mentioned embodiment and specific examples should not be construed as limiting the invention. Various modifications to the above-mentioned embodiment and specific examples are possible, so long as the invention is not modified in essence.

Several modifications are next be exemplified. In the following description of the modifications, component members similar in structure and function to those of the above-mentioned embodiment are denoted by names and reference numerals, which are identical to those of the above-mentioned embodiment. The description of the component members appearing in the above description of the embodiment can be applied as appropriate, so long as no inconsistencies are involved.

Needless to say, even modifications are not limited to those described below. Limitingly construing the present invention based on the above-mentioned embodiment and the following modifications impairs the interests of an applicant (particularly, an applicant who is motivated to file as quickly as possible under the first-to-file system) while unfairly benefiting imitators, and is thus impermissible.

The structure of the above-mentioned embodiment and the structures of the modifications to be described below are entirely or partially applicable in appropriate combination, so long as no technical inconsistencies are involved.

The configuration of a lithium secondary battery 1 to which the present invention is applied is not limited to the above-mentioned configuration. For example, the present invention is not limited to the so-called liquid type battery configuration. That is, for example, solid state electrolytes, such as gel, polymer, glass, and ceramics, may be used as the electrolyte. Further, the cathode active material which may be utilized in the present invention is not limited to the composition illustrated in the specific example.

Referring to FIG. 2A, the cathode active material layer 22 may be formed into a seamless plate (self-supported film). Alternatively, the cathode active material layer 22 may be obtained by two-dimensionally disposing or binding a large number of cathode active material plates.

The present invention is by no means limited to the specific production method described above. That is, for example, a granule of a hydroxide obtained by a co-precipitation method may also be suitably used as the granule. Further, the raw material powder may include a plurality of kinds of transition metal compounds (e.g., oxides, hydroxides, and carbonates). In addition, the forming method is not limited to the above-mentioned method.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

The invention claimed is:

1. A production method for a cathode active material for a lithium secondary battery comprising a lithium composite oxide having a layered rock salt structure, the method comprising:

a granulation step of forming a granule, which comprises a large number of plate-like particles of a transition metal hydroxide constituting a main raw material for the lithium composite oxide and comprises therein a large number of voids in a substantially uniform manner; and a thermal treatment step of thermally treating the granule to form a cathode active material precursor particle, which is formed into a substantially spherical shape and comprises therein a large number of voids in a substantially uniform manner, and has an average particle diameter D50 of 0.5 to 5 μm, a specific surface area of 3 to 25 $m^2/g$, and a relative tap density, which is a value obtained by dividing a tap density by a theoretical density of a material constituting the cathode active material precursor particle, of 0.25 to 0.4;

a forming step of forming a large number of the cathode active material precursor particles into a predetermined shape to provide a green product; and a sintering step of sintering the green product to generate the lithium composite oxide, wherein a lithium compound is added to the cathode active material precursor particle after the cathode active material precursor particle is thermally treated and before the green product is sintered to generate the lithium composite oxide.

2. A production method for a cathode active material for a lithium secondary battery according to claim 1, wherein the granulation step comprises the step of forming the granule through spray drying of a slurry prepared by wet-pulverizing and mixing a raw material powder comprising the transition metal hydroxide.

3. A production method for a cathode active material for a lithium secondary battery according to claim 2, wherein the transition metal hydroxide comprises nickel hydroxide and cobalt hydroxide.

4. A production method for a cathode active material for a lithium secondary battery according to claim 1, wherein the transition metal hydroxide comprises nickel hydroxide and cobalt hydroxide.

* * * * *